United States Patent [19]

Suzuki

[11] Patent Number: 5,195,000

[45] Date of Patent: Mar. 16, 1993

[54] SEARCHING DEVICE FOR A TAPE REPRODUCING APPARATUS

[75] Inventor: Kenji Suzuki, Hamamatsu, Japan

[73] Assignee: Yamaha Corporation, Hamamatsu, Japan

[21] Appl. No.: 579,062

[22] Filed: Sep. 6, 1990

[30] Foreign Application Priority Data

Sep. 8, 1989 [JP] Japan .................................. 1-234235

[51] Int. Cl.$^5$ ........................ G11B 27/10; G11B 27/13
[52] U.S. Cl. ................................................. 360/72.3
[58] Field of Search .......................... 360/72.1–72.3, 360/74.1, 74.2, 74.4

[56] References Cited

U.S. PATENT DOCUMENTS 4,366,371 12/1982 d'Alayer de Costemore d'Arc ................... 360/72.3

FOREIGN PATENT DOCUMENTS

| 55-146673 | 11/1980 | Japan | 360/72.1 |
| 56-87272 | 7/1981 | Japan | 360/72.1 |
| 59-65956 | 4/1984 | Japan | 360/72.3 |
| 60-74138 | 4/1985 | Japan | 360/72.1 |
| 60-182584 | 9/1985 | Japan | 360/72.1 |

Primary Examiner—Jerry Smith
Assistant Examiner—Steven R. Garland
Attorney, Agent, or Firm—Spensley Horn Jubas & Lubitz

[57] ABSTRACT

A searching device for a tape reproducing apparatus reproducing signals recorded on a tape wound on first and second reels includes first and second pulse generators respectively generating a shot of pulse signal each time the first and second reels are rotated by a predetermined angle, first and second counters respectively counting outputs of the first and second pulse generators, detector for detecting a running distance of the tape on the basis of output data of counters and a reproduced signal level detection circuit for detecting whether the level of a reproduced signal from the tape is larger or smaller than a predetermined level. Searching of a selected music piece is performed in response to output data of the detector and a level detection signal from the reproduced signal level detection circuit.

2 Claims, 6 Drawing Sheets

SEARCHING DEVICE FOR A TAPE REPRODUCING APPARATUS

BACKGROUND OF THE INVENTION

This invention relates to a magnetic tape reproducing apparatus (including a tape reproducing and recording apparatus) and, more particularly, to a searching device for a tape reproducing apparatus capable of detecting a head portion of a selected music piece accurately from a tape recording of the music piece (e.g., INTRO SCAN mode or SEARCH mode).

In conventional analog audio tape decks, searching of a selected music piece is made in the following manner. First, a tape is run in a fast-forward mode and an interval (a silent portion) between music pieces is judged to exist when absence of an audio signal continues over a predetermined period of time. Then, upon finding that an audio signal is continuously present over a predetermined period of time, a head portion of the selected music piece is judged to exist and running of the tape is stopped. The tape is then rewound for a predetermined period of time and then playback of the music piece is started.

The conventional searching method would be quite satisfactory if the tape speed was constant regardless of the state of winding of the tape between a supply reel and a takeup reel. In actuality, however, the tape speed varies greatly depending upon the state of winding of the tape between the two reels, e.g., a large amount of tape being wound on the supply reel and a small amount of tape being wound on the takeup reel or vice versa, or an about equal amount tape being wound on each of the supply and takeup reels. For this reason, the time at which a head portion of a selected music piece or an interval between music pieces is assumed to arrive and the time which is assumed to be necessary for rewinding must be changed each time having regard to the tape speed in each situation. Even if care has been taken for this purpose, irregularity in cueing is inevitable with an undesirable result that a last portion of an unselected preceding music piece is reproduced or a head portion of a selected music piece is omitted.

It is, therefore, an object of the invention to provide a searching device for a tape reproducing apparatus capable of accurately performing cueing of a selected music piece.

SUMMARY OF THE INVENTION

For achieving the above described object of the invention, the searching device for a tape reproducing apparatus reproducing signals recorded on a tape wound on first and second reels comprises first pulse generation means for generating a shot of pulse signal each time the first reel is rotated by a predetermined angle, second pulse generating means for generating a shot of pulse signal each time the second reel is rotated by a predetermined angle, first counter means for counting output of the first pulse generation means, second counter means for counting output of the second pulse generation means, memory means prestoring a plurality of different time data $\Delta t$ corresponding to ratios of counts, reading means for calculating a ratio of counts of the first and second counter means for a predetermined period of time and reading out time data $\Delta t$ corresponding to the calculated ratio of counts from the memory means, accumulation means for accumulating the time data $\Delta t$ read from the memory means each time the pulse signal is generated by the first or second pulse generation means, detecting means for detecting a running distance of the tape in correspondence to output data of the accumulation means and reproduced signal level detection means for detecting whether the level of a reproduced signal from the tape is larger or smaller than a predetermined level, searching of a head portion of a selected music piece being performed in response to output data of said detecting means and a level detection signal from said reproduced signal level detection means.

According to the invention, the ratio of rotation speeds of the first and second reels is computed and the time data $\Delta t$ corresponding to this ratio of rotation speeds is read from the memory means. The read out time data $\Delta t$ is accumulated by the accumulation means and a running distance of the tape is computed from the accumulated value. This compensates for the change in the tape speed due to variation in the state of winding of the tape between the two reels and, accordingly, a very accurate searching of a selected music piece can be achieved regardless of the variation in the tape speed.

In one aspect of the invention, the searching device for a tape reproducing apparatus reproducing signals recorded on a tape wound on first and second reels comprises first pulse generation means for generating a shot of pulse signal each time the first reel is rotated by a predetermined angle, second pulse generation means for generating a shot of pulse signal each time the second reel is rotated by a predetermined angle, counter means for counting output pulses of the first and second pulse generation means together, detecting means for detecting a running distance of the tape in correspondence to output data of said counter means, and reproduced signal level detection means for detecting whether the level of a reproduced signal from the tape is larger or smaller than a predetermined level, searching of a selected music piece being performed in response to output data of said counter means and a level detection signal from said reproduced signal level detection means.

According to this aspect of the invention, outputs of the first pulse generation means which generates a pulse signal each time the first reel is rotated by a predetermined angle and the second pulse generation means which generates a pulse signal each time the second reel is rotated by a predetermined angle are counted together by the counter means and a running distance of the tape is detected from the count value of the counting means. In this case, the accuracy of detection of a tape running distance is not so high as the first described construction but yet is remarkably improved over the conventional searching method which assumes a tape running distance merely on the basis of time length of driving a tape. Accordingly, this construction is capable of performing searching more accurately than the conventional tape reproducing apparatuss.

Preferred embodiments of the invention will now be described with reference to the accompanying drawings.

BRIEF DESCRIPTION OF THE DRAWINGS

In the accompanying drawings,

FIGS. 3 to 5A and 5B are flow charts for explaining the operation of the embodiment of FIG. 1;

DESCRIPTION OF PREFERRED EMBODIMENTS

Figure 1:
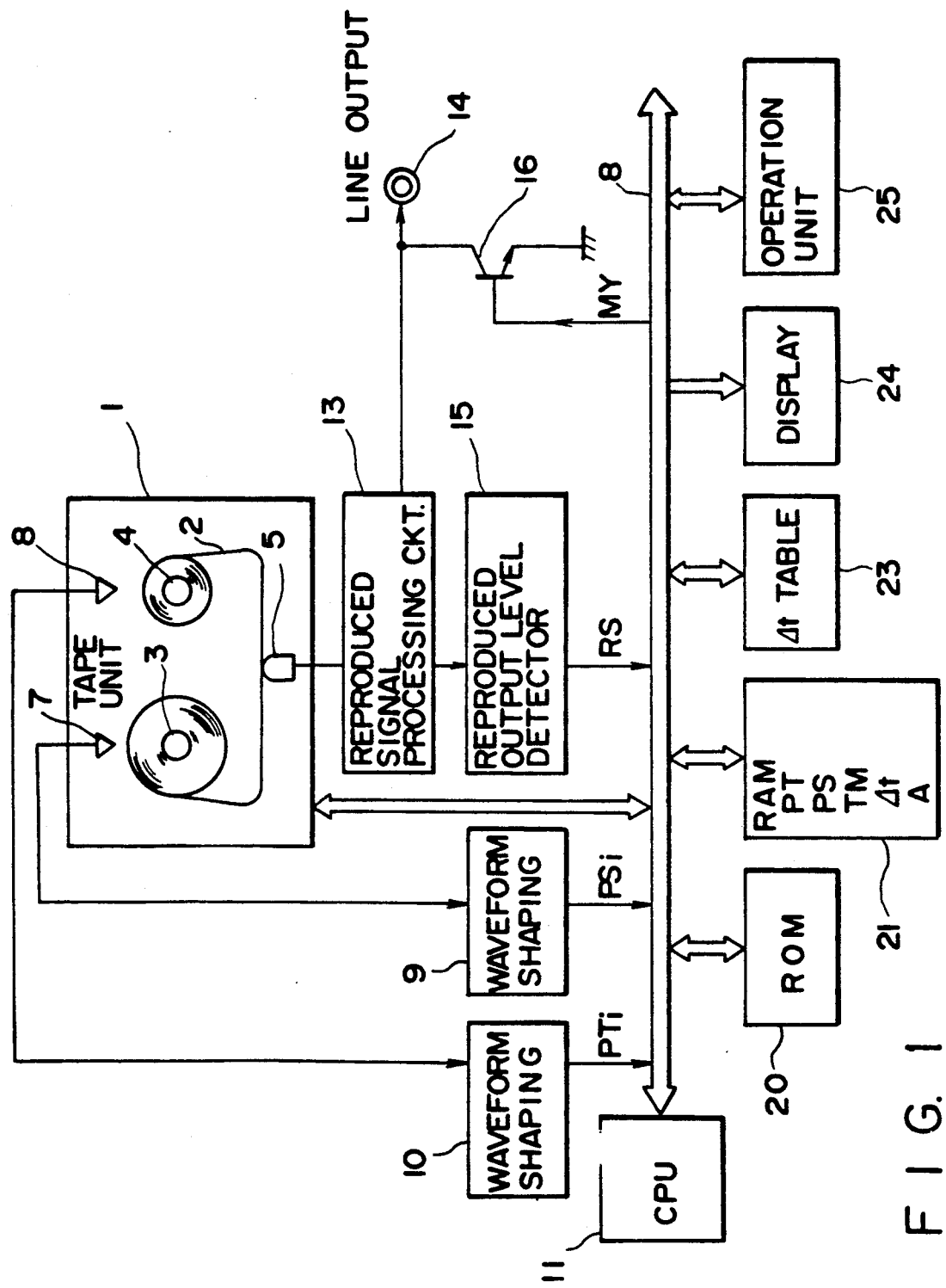
FIG. 1 is a block diagram showing an embodiment of the invention.
Figure 2:
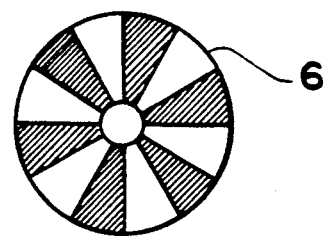
FIG. 2 is a diagram showing a rotary plate attached to reels 3 and 4 in FIG. 1.
Figure 4:
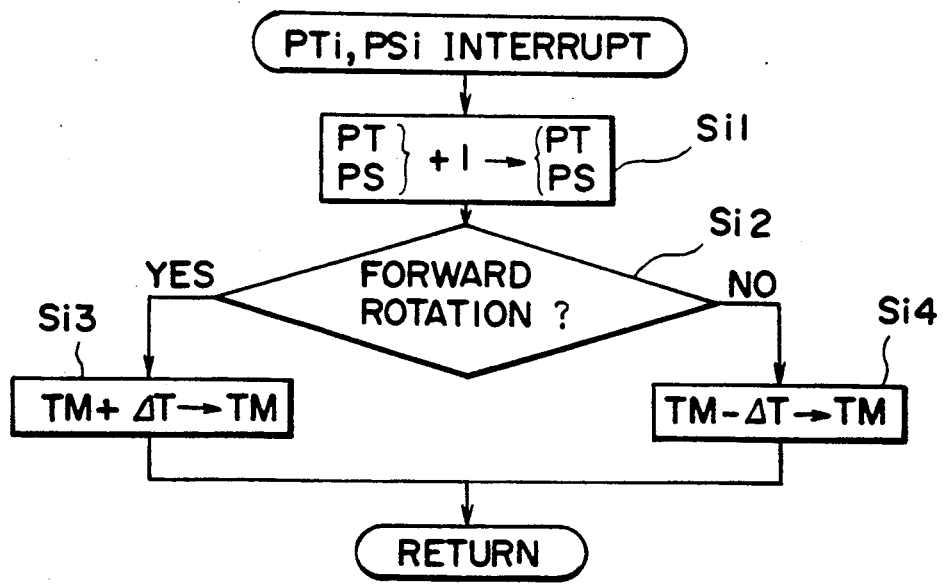

FIG. 1 shows an example of a tape reproducing apparatus incorporating an embodiment of the cueing device according to the present invention. In a tape unit 1, there are provided first and second reels 3 and 4, a reproducing head 5 and a drive mechanism (not shown) for driving the reels 3 and 4. On the upper surfaces of the reels 3 and 4 are provided rotary plates 6 as shown in FIG. 2. The surface of the rotary plate 6 is divided in a radial direction into twelve sections which are colored in black and white alternately. Reflecting type photo-detectors 7 and 8 are provided adjacent these rotary plates 6. By this arrangement, each of the photo-detectors 7 and 8 produces six pulse signals as each of the reels 3 and 4 is rotated by 360 degrees and these pulse signals are supplied to waveform shaping circuits 9 and 10.

The waveform shaping circuits 9 and 10 shape output pulses of the photo-detectors 7 and 8 and supply the waveform-shaped outputs as interrupting signals PSi and PTi to a CPU (central processing unit) 11 through a bus line B. A reproduced signal processing circuit 13 processes the output of the reproducing head 5 and includes a reproducing equalizer circuit, an amplifier circuit and a noise reduction circuit. The output of the reproduced signal processing circuit 13 is supplied to a line output terminal 14. A reproduced output level detector 15 provides on the bus line B a reproduced level signal RS which is turned to logical level "1" when the level of a reproduced signal exceeds a predetermined level and to logical level "0" when the level of the reproduced signal is below the predetermined level. When a mute signal MY ("1" signal) has been supplied from the CPU 11 to a muting transistor 16 through the bus line B, the output level at the line output terminal 14 drops to the ground level.

The CPU 11 controls respective units of the device and is connected to these units by the bus line B. A ROM 20 stores programs for the CPU 11 and a RAM 21 for temporary storage includes three counters, PT, PS and TM and two registers Δt and A. In this embodiment, the PT counter, the PS counter and the TM counter are constructed using software and the three counters count interrupting signals PTi, PSi and time data respectively. A Δt table (ROM) 23 stores a plurality of time data Δt each corresponding to one of a plurality of ratios of rotation speeds of the reels 3 and 4. A digital display 24 displays numerical values corresponding to a running distance of the tape 2. An operation unit 25 includes function keys for designating playback, fast forward and rewind or the like, ten keys for inputting a music number of music piece to be cued and a power switch or the like.

The operation for cueing a selected music piece in the tape reproducing apparatus of the above described construction will be described with reference to FIG. 3 to 6.

Figure 3:
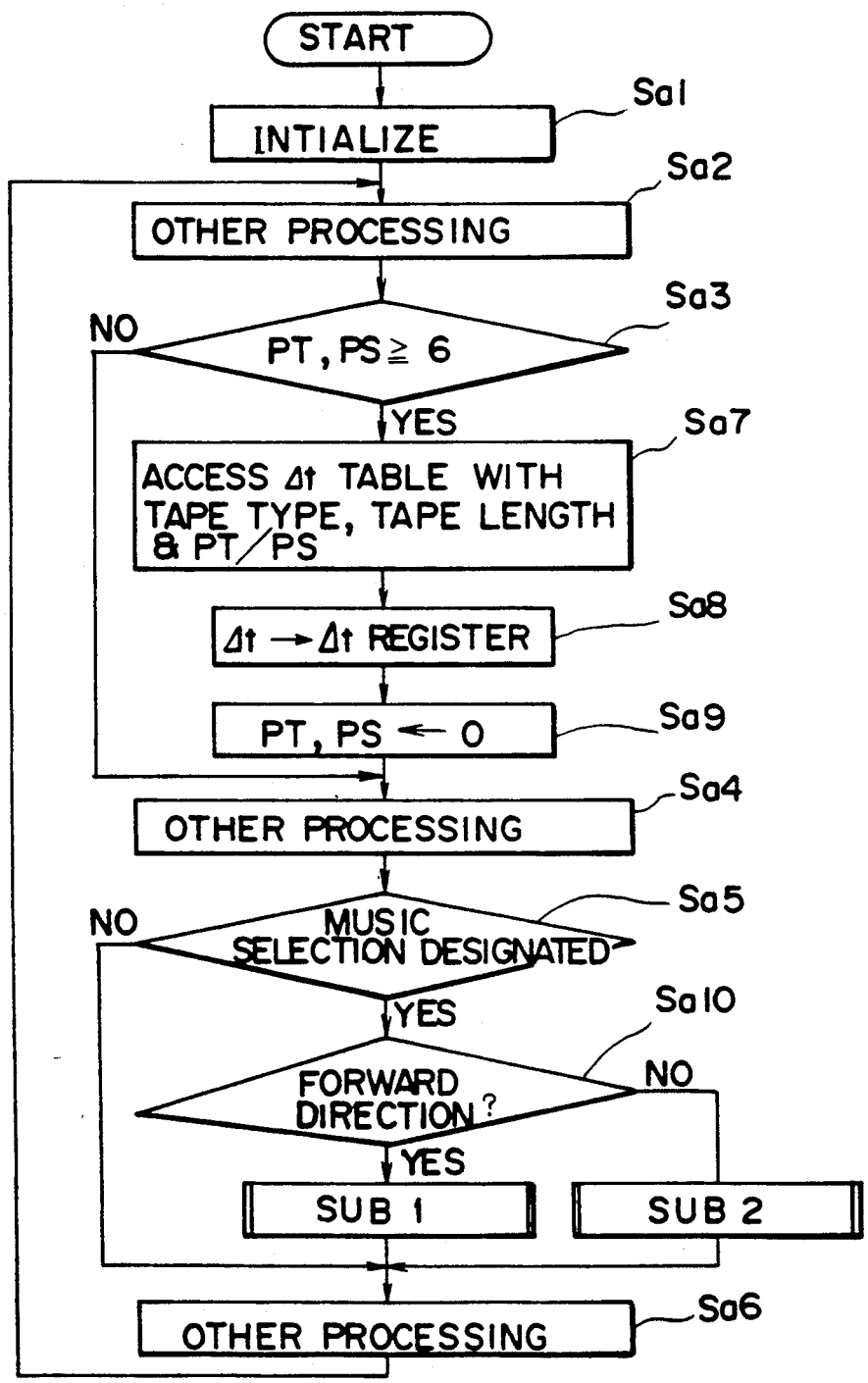

FIG. 3 is a flow chart showing the main routine of the CPU 11. Upon turning on of the power, the routine by the CPU 11 proceeds first to step Sa1. In this step, an initializing processing such as clearing of the PT, PS and TM counters and the Δt and A registers is executed. Then, the routine proceeds to step Sa2 in which processing other than searching is performed (e.g., control of the drive mechanism the amplifier or the like). The routine then proceeds to step Sa3 in which whether or not counts of the PT counter and the PS counter are both six or more is judged. When the result of judgement is NO, the routine proceeds to step Sa4. In step Sa4, processing other than searching is executed again. The routine proceeds to step Sa5 in which whether or not the designation of selection of music piece has been made at the operation unit 25 is judged. When result of judgement is NO, the routine proceeds to step Sa6. In step Sa6, processing other than searching is executed again. Then, the routine returns to step Sa2. Thereafter, steps Sa2 to Sa6 are repeatedly executed.

Then, when the operator has designated play (playback), fast forward or rewind or the like by operating a function key in the operation unit 25, the reels 3 and 4 of the tape unit 1 are rotated. Each time the reels 3 and 4 are rotated respectively by 60 degrees, interrupting signals PSi and PTi are produced by the waveform shaping circuits 9 and 10 and supplied to the CPU 11. The CPU 11 receives the interrupting signal PSi or PTi and thereupon performs a processing shown in FIG. 4. The routine first proceeds to step Si1 in which the PT counter or PS counter corresponding to the interrupting signals is incremented. Then, the routine proceeds to step Si2 in which whether or not the direction of rotation of the reels 3 and 4 is forward direction is judged. When the result of judgement is YES (i.e., forward direction), the routine proceeds to step Si3 in which data of the Δt register is added to data of the TM counter and the result of addition is written in the TM counter. When result of judgement in step Si2 has been NO, the routine proceeds to step Si4 in which data of the Δt register is subtracted from data of the TM counter and the result of subtraction is written in the TM counter. Then the main routine of FIG. 3 is performed again. Description will be made about data of the Δt register later. The "time data" herein does not mean actual time elapsed but a running distance converted on the basis of the tape speed during normal playback. In the count value etc. displayed on the display 24, therefore, a running distance of 4.75 centimeter is expressed as 1 second.

Figure 7:
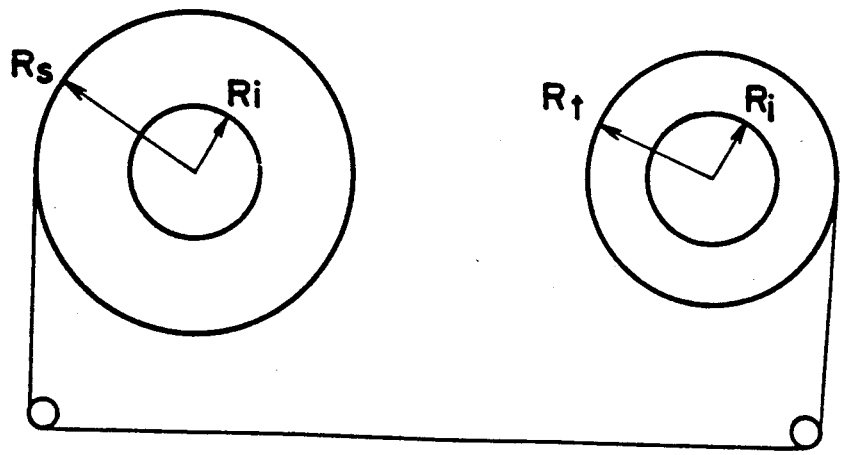
FIG. 7 is a diagram showing a basic construction of a tape unit.

Referring to FIG. 7, it is assumed that the number of pulses generated is Pt on the take-up reel side and Ps on the supply-reel side during the time T in the playback mode. A running distance of the tape per pulse averaged by the pulse numbers of both the take-up reel and supply reel and converted to the above described time data Δt is $$\Delta t = \frac{\Delta T}{Pt + Ps}$$

Assuming that n pulses are generated per single rotation of each reel, the rotation angle during the time ΔT of each reel is Pt/n and Ps/n. In the state at this moment, time required for each reel for making a single rotation is T n/Pt and n/Ps. On the other hand, assuming that the radius of the tape wound on each reel is Rt and Rs and the running speed of the tape during normal playback is v, $$\frac{\Delta T \cdot n}{Pt} = \frac{2\pi Rt}{v} \quad \therefore Rt = \frac{v}{2\pi} \cdot \frac{\Delta T \cdot n}{Pt} \quad (1)$$

Similarly, $\quad Rs = \frac{v}{2\pi} \frac{\Delta T \cdot n}{Ps} \quad (2)$

The area of the take-up reel as viewed from the reel shaft side is $\pi Rt^2$ and the area of the hub having a radius of Ri is $\pi Ri^2$ and hence the area of the tape only is $\pi(Rt^2 - Ri^2)$. Assuming that the thickness of the tape is $\delta$, the length of the tape wound on the take-up reel is $$Lt = \frac{\pi(Rt^2 - Ri^2)}{\delta}$$

Similarly, $\quad Ls = \frac{\pi(Rs^2 - Ri^2)}{\delta}$

Since the total length of the tape wound on the reels always the same, $$L = Lt + Ls = \frac{\pi}{\delta}(Rt^2 + Rs^2 - 2Ri^2) \quad (3)$$

$$\therefore Rt^2 + Rs^2 = \frac{\pi}{\delta}L + 2Ri^2$$

Substituting (1), (2) for (3), $$\left(\frac{v\Delta T n}{2\pi}\right) \cdot \left(\frac{1}{Pt^2} + \frac{1}{Ps^2}\right) = \frac{\pi}{\delta}L + 2Ri^2 \quad (4)$$

$$\therefore \Delta T^2 = \frac{\pi L/\delta + 2Ri^2}{\left(\frac{vn^2}{2\pi}\right)\left(\frac{1}{Pt^2} + \frac{1}{Ps^2}\right)}$$

$$\therefore \Delta T = \sqrt{\frac{4\pi^2}{v^2 n^2}\left[\frac{\pi L}{\delta} + 2Ri + \frac{Pt^2 \cdot Ps^2}{(Pt + Ps)^2(Pt^2 + Ps^2)}\right]}$$

In other words, when the tape of the hub radius Ri, tape thickness δ and total length L is running at the tape speed v and pulses of the number Pt are generated on the take-up reel side and pulses of the number Ps are generated on the supply reel side during the same period of time, time data increment (or decrement) per single pulse of the pulses generated both on the take-up reel side and the supply reel side can be obtained by the above equation (4).

In the present embodiment, the calculation of the equation (4) is not made in the microcomputer during the playback mode but the time data Δt which is determined by the ratio between PT and PS for each tape kind (e.g., LH, CrO2, Metal, C-60, C-90, C-46, C46L etc.) is calculated by the equation (4) beforehand and prestored in the table 23 as the data table for calculation to be made at each pulse inputting.

When each of the reels 3 and 4 has been rotated over 360 degrees, result of judgement in step Sa3 (FIG. 3) becomes YES and the routine proceeds to step Sa7. In step Sa7, a ratio PT/PS of the count of the PT counter to the count of the PS counter as well as data representing the type and length of the currently used tape 2 are supplied to the Δt table 23. Time data Δt corresponding to the type and length of the tape 2 and corresponding also to the ratio PT/PS thereby is read from the Δt table 23. The ratio PT/PS becomes a value which is proportionate to the ratio of the winding number of the tape 2 wound on the reel 4 and the winding number of the tape 2 wound on the reel 3. Then, the routine proceeds to step Sa8 in which the time data Δt is written in the Δt register. The routine proceeds to step Sa9 in which both the PS counter and PT counter are cleared. Then processing of step Sa4 and subsequent steps is executed.

In the above described manner, each time the reels 3 and 4 are rotated over 360 degrees, time data Δt of the Δt register is rewritten to data corresponding to the ratio of current winding numbers of the reels 3 and 4. Each time the interrupting signals PTi and PSi are generated, the time data Δt is added to or subtracted from data in the TM counter (see FIG. 4).

Then, upon the designation of selection of a music piece by the operator, the result of judgement in step Sa5 (FIG. 3) becomes YES and the routine proceeds to step Sa10. In step Sa10, whether or not the music piece to be searched is located in forward direction or rewinding direction is judged. When the result of judgement is YES (i.e., forward direction), the routine proceeds to a subroutine SUB1.

Figure 5A:
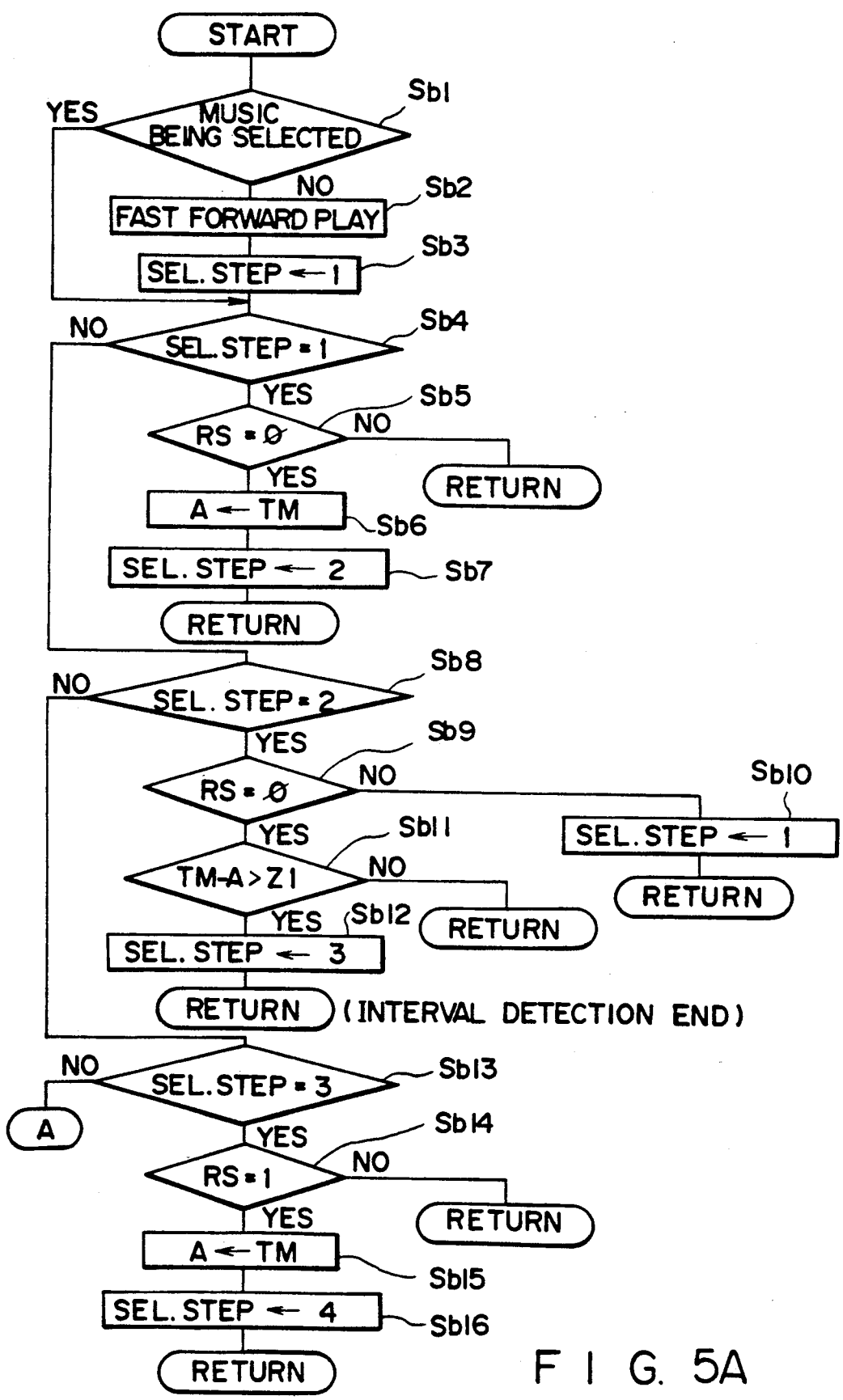
Figure 5B:
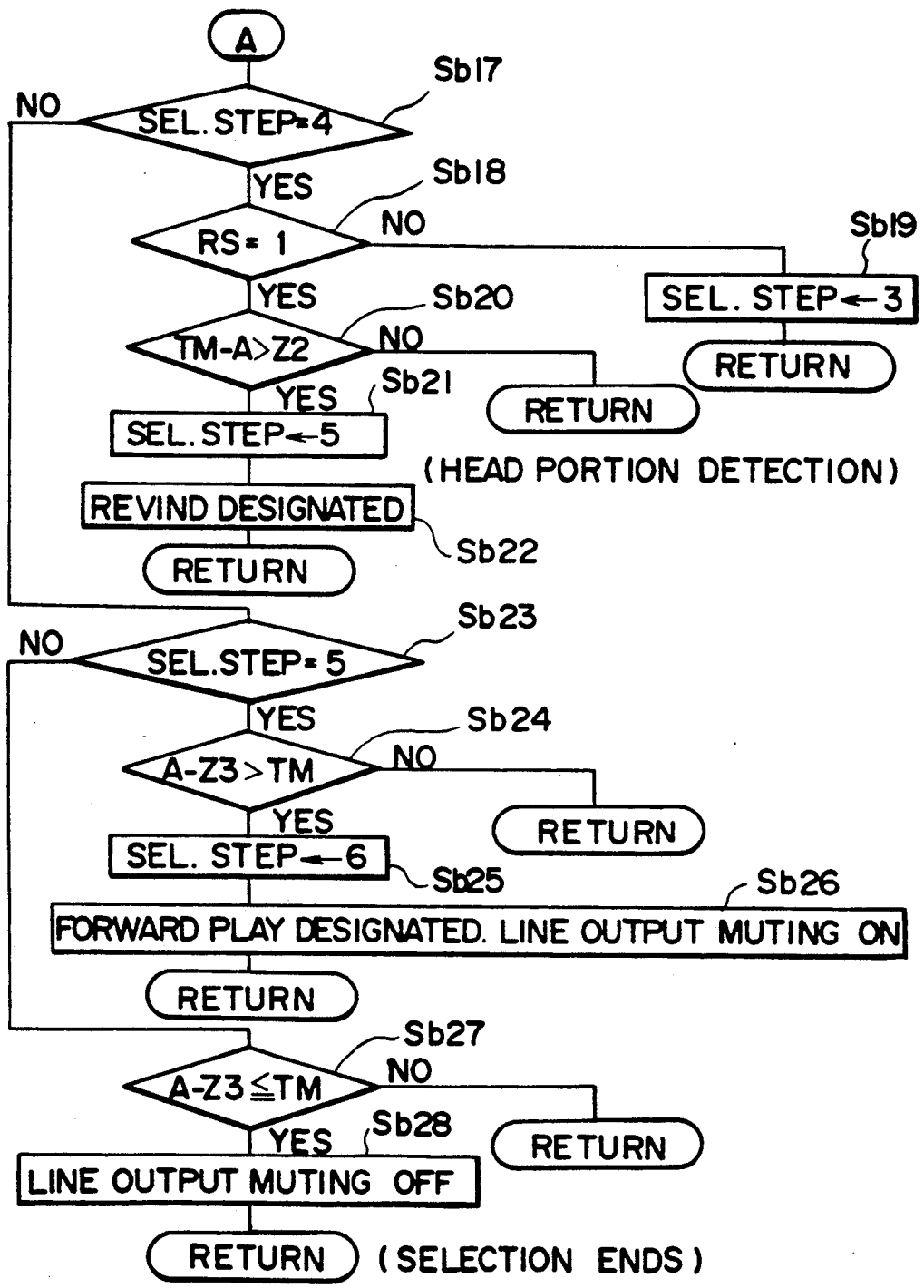

FIGS. 5A and 5B are flow charts showing the subroutine SUB1. The illustrated subroutine SUB1 is all for executing searching of a particular music piece (one music piece selection). For preventing ceasing of change of the time data Δt upon stopping of the main routine of FIG. 3 during a processing for selecting a particular music piece, the subroutine SUB1 is divided into sections and executed section by section. That is, a flag rises at the end of each executed section of the subroutine SUB1 for indicating which section or sections of the subroutine SUB1 have been executed and, upon rising of the flag, the processing once returns to the main routine and the processing for music selection is resumed from the continuation section when processing of the subroutine has been called for. This routine will be described more fully below.

First, in step Sb1, whether or not a music piece is being selected (i.e., whether or not the operation of the music piece selection has been started) is judged. When the result of judgement is NO (i.e., the operation of the music piece selection has not been started yet), the routine proceeds to step Sb2. In step Sb2, a fast playback is designated to the tape unit 1. The tape 2 is played back at a fast speed. The routine proceeds to step Sb3 in which the music piece selection step is set to "1". Then, the routine proceeds to step Sb4. In step Sb4, whether or not the music piece selection step is "1" is judged. In this case, the result of judgement becomes YES and the routine proceeds to step Sb5. In step Sb5, whether or not the reproduced level signal RS produced by the reproduced output level detector 15 is "0" is judged. When the result of judgement is NO, the main routine of FIG. 3 is executed. Thereafter, processing of steps Sa6, Sa2 . . . Sa5 and Sa10 are executed and the subroutine SUB1 of FIG. 5 is executed again.

In the subroutine SUB1, the routine proceeds to step Sb1. In this case, the result of judgement in step Sb1 is YES so that the routine proceeds to step Sb4. At this time, result of judgement in step Sb4 is YES and the routine proceeds to step Sb5. In step Sb5, whether or not the reproduced level signal RS is "0" is judged. When the result of judgement is NO, the main routine of FIG. 3 is executed. When the reproduced level signal RS has become "0", the result of judgement in step Sb5 becomes YES and the routine proceeds to step Sb6. In step Sb6, the count of the TM counter is written in the A register. Then, the routine proceeds to step Sb7 in which the music piece selection step is set to "2". Then, the processing returns to the main routine.

Thereafter, the processing of the main routine is executed and then the processing of the subroutine SUB1 is executed. The routine proceeds to step Sb8 through steps Sb1 and Sb4. In step Sb8, whether or not the music piece selection step is "2" is judged. In this case, the result of judgement becomes YES and the routine proceeds to step Sb9. In step Sb9, whether or not the reproduced level signal RS is "0" is judged again. When the result of judgement is NO, the routine proceeds to step Sb10 in which the music piece selection step is set to "1" again and the above described processing is repeated. When the result of judgement in step Sb9 is YES, the routine proceeds to step Sb11. In step Sb11, whether or not a value resulting from subtracting data of the A register from data of the TM counter is larger than a predetermined period of time Z1 (e.g., 2 sec.) is judged. When result of judgement is NO, the processing returns to the main routine and then the processing of the main routine→Sb1→Sb4→Sb8 Sb9→Sb11→the main routine is repeatedly executed. When result of judgement in step Sb11 has become YES, the routine proceeds to step Sb12. In step Sb12, the music piece selection step is set to "3" and the processing returns to the main routine.

The above described processing is one for detecting an interval between music pieces. In this embodiment, an interval between music pieces is judged to exist when the reproduced level signal RS shown in FIG. 6A has maintained the state "0" for the predetermined period of time Z1 (time based on the time data Δt) after the reproduced level signal RS has fallen to "0". In this case, the routine proceeds to next music piece selection step "3". When the reproduced level signal RS has risen to "1" before the predetermined period of time Z1 has elapsed, the result of judgement in step Sb9 becomes NO and the routine returns to the music piece selection step "1" (in this case, an interval between music pieces is not judged to exist).

After the main routine is executed, the subroutine SUB1 is executed again. In this subroutine SUB1, the routine proceeds to step Sb13 through steps Sb1, Sb4 and Sb8. In this case, the result of judgement in step Sb13 becomes YES and the routine proceeds to step Sb14. In step Sb14, whether or not the reproduced level signal RS is "1" is judged. When result of judgement is NO, the processing returns to the main routine and thereafter the processing of the main routine→Sb1→Sb4→Sb8→Sb13→Sb14→the main routine is repeated. When the result of judgement in step Sb14 has become YES, the routine proceeds to step Sb15. In step Sb15, the count of the TM counter is written in the A register. Then the routine proceeds to step Sb16 in which the music piece selection step is set to "4". Then, the processing returns to the main routine.

Then, the main routine is executed and the subroutine SUB1 is executed in which the routine proceeds to step Sb17 through Sb1, Sb4, Sb8 and Sb13. In step Sb17, whether or not the music piece selection step is "4" is judged. In this case, the result of judgement becomes YES so that the routine proceeds to step Sb18. In step Sb18, whether or not the reproduced level signal RS is "1" is judged again. When the result of judgement is NO, the routine proceeds to step Sb19 in which the music piece selection step returns to "3". Then, the processing returns to the main routine. When the result of judgement in step Sb18 is YES, the routine proceeds to step Sb20. In step Sb20, whether or not a value resulting from subtracting data of the A register from data of the TM counter is larger than a predetermined period of time Z2 (e.g., 5 sec.) is judged. When the result of judgement is NO, the processing returns to the main routine and thereafter the processing of the main routine→Sb1→Sb4→Sb8→Sb13→Sb17→Sb18→Sb20→the main routine is repeated. When the result of judgement in step Sb20 has become YES, the routine proceeds to step Sb21. In step Sb21, the music piece selection step is set to "5".

Figure 6A:
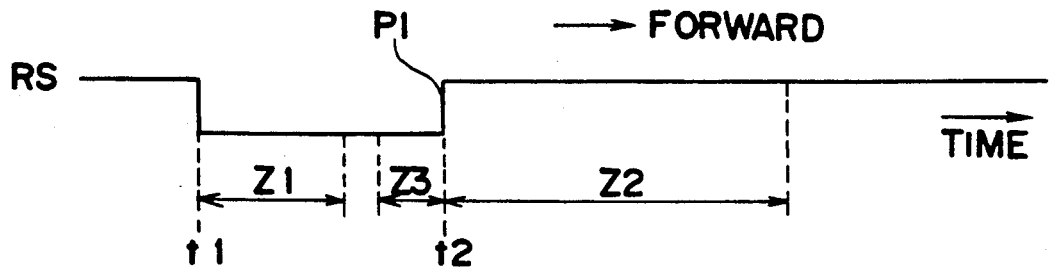
FIGS. 6A and 6B are time charts for explaining the operation of the embodiment of FIG. 1.

The above described processing is one for detecting a head portion of a selected music piece. In this embodiment, a head portion of a selected music piece is judged to exist when the reproduced level signal RS has maintained the state "1" during the predetermined period of time Z2 (time based on the time data Δt) after the reproduced level signal RS has risen to "1" as shown in FIG. 6A. In this case, the routine proceeds to next music piece selection step "5". When the reproduced level signal RS has fallen to "0" before the predetermined period of time Z2 has elapsed, the result of judgement in step Sb18 becomes NO and the routine returns to the music piece selection step "3".

After executing the above described step Sb21, the routine proceeds to step Sb22. In step Sb22, a signal designating rewinding of the tape 2 is supplied to the tape unit 1. Rewinding of the tape 2 thereby is started. Then, the processing returns to the main routine. After execution of the main routine, the subroutine SUB1 is executed in which the routine proceeds to step Sb23 through Sb1, Sb4, Sb8, Sb13 and Sb17. In step 23, whether or not the music piece selection step is "5" is judged. In this case, the result of judgement becomes YES so that the routine proceeds to step Sb24. In step Sb24, whether or not a value resulting from substracting a predetermined period of time Z3 (e.g., 1 sec.) from data of the A register (data of the TM counter at rising designated by reference characters P1 in FIG. 6A, refer to step Sb15) is larger than data of the TM counter is judged. When the result of judgement is NO, the processing returns to the main routine. Thereafter, the processing of the main routine→Sb1→Sb4→Sb8→Sb13→Sb17→Sb23→Sb24→ the main routine is repeated. When the result of judgement in step Sb24 has become YES, the routine proceeds to step Sb25. In step Sb25, the music piece selection step is set to "6". Then the routine proceeds to step Sb26 in which a signal designating forward play is supplied to the tape unit 1 and a mute signal MY ("1" signal) is supplied to the transistor 16. The playback of the tape 2 in forward direction thereby is started and also muting is applied to the line output. Then the processing returns to the main routine.

Then, after execution of the main routine, the subroutine SUB1 is executed in which the routine proceeds to step Sb27 through Sb1, Sb4, Sb8, Sb13, Sb17 and Sb23. In step Sb27, whether or not a value resulting from subtracting the predetermined period of time Z3 from data of the A register is equal to or smaller than data of the TM counter is judged. When the result of judgement is NO, the processing returns to the main routine and the processing of the main routine→Sb1→Sb4→Sb8→Sb13→Sb17→Sb23→Sb27→ the main routine is repeated. When the result of judgement in step Sb27 has become YES, the routine proceeds to step Sb28. In step Sb28, the mute signal MY is turned off ("0" signal). The muting which has been applied to the line output thereby is removed and a reproduced tone signal can thereafter be produced from the line output terminal 14. Then the processing returns to the main routine.

As described above, upon detection of the head portion of the selected music piece, rewinding of the tape 2 is performed. During rewinding, Δt is subtracted from the contents of the TM counter each time the interrupting signal PSi or PTi is generated (refer to step Si4 in FIG. 4). At a time point when the tape 2 has been rewound for a predetermined period of time Z3 (time based on the time data Δt) from the rise portion of the music piece (see the reference character P1 in FIG. 6A), rewinding of the tape 2 is stopped and then playback of the tape 2 is started. When rewinding of the tape 2 has been stopped, the tape 2 is further rewound by a small distance due to inertia. If a normal playback was started immediately in this state, the last portion of a preceding music piece might be reproduced. In this embodiment, therefore, the arrangement is made in such a manner that muting is applied to the line output simultaneously with starting of playback in forward direction in step Sb26 and the muting is removed when the value of the TM counter has become equal to the data A-Z3.

The above described processing is one for searching in forward direction. Nextly, a processing for searching in rearward direction will be explained. The processing for cueing in rearward direction is similar to that for cueing in forward direction so that description of the processing in detail with respect to the flow charts will be omitted and description will be made briefly with reference to the time charts of FIG. 6B.

Figure 6B:
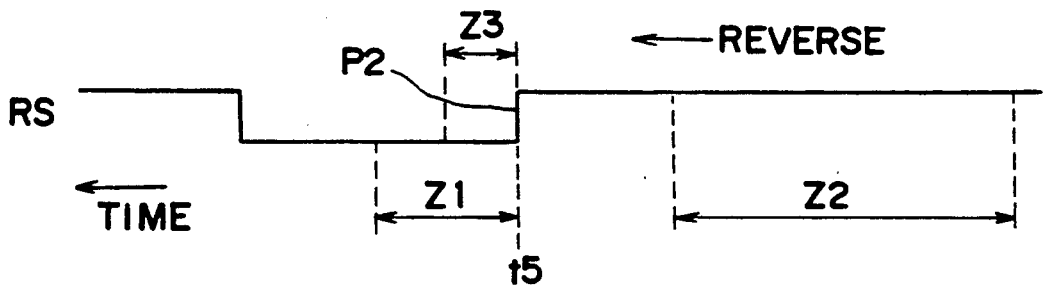

When the result of judgement in step Sa10 in FIG. 3 is NO, the processing in the subroutine SUB2 is executed. In this subroutine SUB2, a signal designating rewinding of the tape 2 is supplied to the tape unit 1. Rewinding of the tape 2 thereby is started. Then, detection of a music piece is performed. That is, a music piece is detected when the reproduced level signal RS has maintained "1" state over the predetermined period of time Z2 (time based on the time data Δt) as shown in FIG. 6B. Then, detection of an interval between music pieces is made. That is, an interval between music pieces is detected when the reproduced level signal RS has maintained "0" state over the predetermined period of time Z1 (time based on the time data Δt). Upon detection of the interval, a signal designating play (playback) is supplied to the tape unit 1 and the mute signal MY is supplied to the transistor 16. Playback of the tape 2 thereby is started and, simultaneously, muting is applied to the line output. Then, the muting is removed at a time point before the rise portion of the music piece (see the reference character P2 in FIG. 6B) by the predetermined period of time Z3 (time based on the time data Δt). Thereafter, a reproduced tone is sounded at a time point when the time Z3 has elapsed.

Another embodiment of the invention will now be described.

In this embodiment, the Δt register and the Δt table in the first described embodiment are not provided but the TM counter is incremented (in the case of forward feeding) or decremented (in the case of rearward feeding) each time the interrupting signal PSi or PTi is generated. By this construction, searching which is not so accurate as in the first described embodiment yet is by far more accurate than in the conventional searching device relying upon the tape speed can be realized. The reason is that, in the case of a C60 tape for 60 minutes, the tape running speed in the fast forward mode varies by nearly 100% depending upon the tape winding state whereas a total number of the interrupting pulse signals PSi and PTi generated in a predetermined period of time varies only by about 30% depending upon the tape winding state.

What is claimed is:

1. A searching device for a tape reproducing apparatus for reproducing signals recorded on a tape wound on first and second reels comprising:
    first pulse generation means for generating a first pulse signal each time the first reel is rotated by predetermined angle;
    second pulse generating means for generating a second pulse signal each time the second reel is rotated by a predetermined angle;
    first counter means for counting the first pulse signals generated by the first pulse generation means;
    second counter means for counting the second pulse signals generated by the second pulse generation means;
    memory means for prestoring a plurality of different time data Δt corresponding to different ratios of counts;
    reading means for calculating a ratio of counts of the first and second counter means for a predetermined period of time and reading out time data Δt corresponding to the calculated ratio of counts from the memory means;
    accumulation means for accumulating the time data Δt read from the memory means each time a pulse signal is generated by the first or second pulse generation means;
    detecting means for detecting a running distance of the tape in correspondence to output data of the accumulation means;
    reproduced signal level detection means for detecting whether the level of a reproduced signal from the tape is larger or smaller than a predetermined level; and
    searching means for searching a head portion of a selected music piece in response to output data of the detecting means and a level detection signal from the reproduced signal level detection means.

2. A searching device for a tape reproducing apparatus according to claim 1, including muting means for initiating muting an output line of a reproduced signal when the tape is driven for reproducing a signal by a driver for playing back the tape after the head portion of the selected music piece has been detected and terminating muting of the output line when the running distance of the tape has reached a predetermined value during driving of the tape for playback.

* * * * *